United States Patent
Arai

[11] 4,190,324
[45] Feb. 26, 1980

[54] ACHROMATIC OBJECTIVE LENS

[75] Inventor: Yasunori Arai, Asaka, Japan

[73] Assignee: Asahi Kogaku Kogyo Kabushiki Kaisha, Tokyo, Japan

[21] Appl. No.: 954,032

[22] Filed: Oct. 23, 1978

[30] Foreign Application Priority Data

Oct. 21, 1977 [JP] Japan .................. 52-126578

[51] Int. Cl.² .............................. G02B 9/16
[52] U.S. Cl. .................................. 350/226
[58] Field of Search ........................ 350/226

[56] References Cited

U.S. PATENT DOCUMENTS 3,443,864   5/1969   Ackroyd .................. 350/226

FOREIGN PATENT DOCUMENTS 1459307  10/1966  France ..................... 350/226

Primary Examiner—Paul A. Sacher
Attorney, Agent, or Firm—Sughrue, Rothwell, Mion, Zinn and Macpeak

[57] ABSTRACT

An achromatic objective lens having an aperture ratio of about 1:12 and a viewing angle of about ±1° for use in an astronomical telescope is disclosed. The lens uses conventionally available optical materials matched to produce optimum compensation of various aberrations.

1 Claim, 4 Drawing Figures

SPHERICAL ABERRATION SINE CONDITION

CHROMATIC ABERRATION

ASTIGMATISM

ACHROMATIC OBJECTIVE LENS

BACKGROUND OF THE INVENTION

This invention relates to an achromatic objective lens having an aperture ratio of about 1:12 and a viewing angle of about ±1° for use as an objective lens of an astronomical telescope. In an astronomical telescope or the like having a long focal length and a narrow view angle, it is most important to eliminate the secondary spectrum of chromatic aberration and to compensate for spherical aberration and comatic aberration, in various aberration compensations. Such aberrations greatly effect the sharpness of the focused image.

In order to eliminate or compensate for the particular aberrations, for example, the secondary spectrum, fluorite having a particularly low dispersion or similar optical material has been heretofore used. However, such a material is expensive and cannot be readily mass-produced. For this reason, a so-called apochromatic lens composed of three lenses not using any particular glass material has been considered. The apochromatic must have lens surfaces having large curvatures due to the strong lens power of each lens. This results in difficulty of manufacturing and at the same time, the resulting lens has a large amount of the residual and the chromatic aberrations due to the spherical aberration. Therefore, the sharpness of the image is low and the aperture ratio is limited to about 1:15.

SUMMARY OF THE INVENTION

In view of the above noted defects, the present invention provides an achromatic objective lens in which a general glass material which is inexpensive is used without a particular optical material having a low dispersion. The chromatic aberration can be remarkably reduced in comparison with a conventional achromatic lens, spherical aberration and chromatic aberration of spherical aberration can be maintained at low levels, and the aperture ratio is about 1:12, which results in a bright lens system.

Accordingly, it is an object of this invention to define an achromatic objective lens using inexpensive materials.

It is another object of this invention to provide for an achromatic objective lens having excellent optical properties such as reductions in chromatic aberration and in the secondary spectrum.

These and other objects will become apparent from the description of the preferred embodiment and accompanying drawings.

DESCRIPTION OF THE PREFERRED EMBODIMENT

Figure 1:
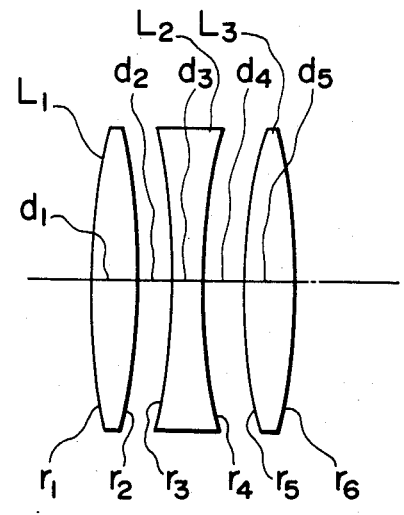
FIG. 1 shows a lens construction corresponding to this invention.
Figure 2A:
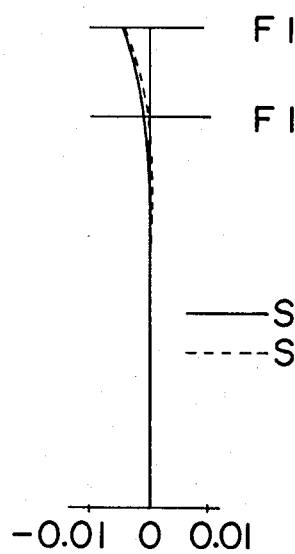
FIGS. 2a, 2b and 2c show aberration graphs of the invention with respect to an infinite object, a showing spherical aberration and sine condition; b, chromatic aberration; and c, astigmatism.
Figure 2B:
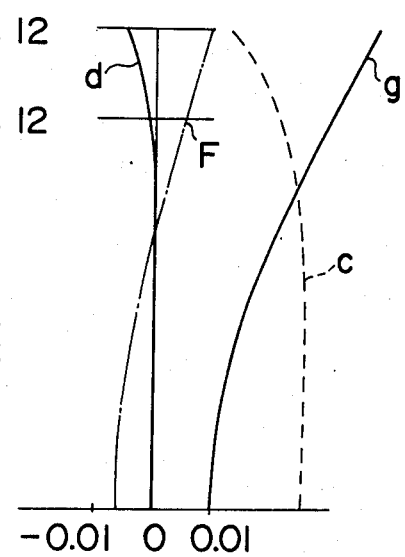
Figure 2C:
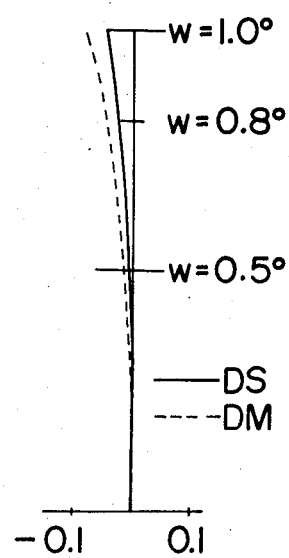

The lens system of the present invention is composed of three lenses arranged in order of positive, negative and positive lenses as shown in FIG. 1. The first positive lens is designated by $L_1$; the negative lens, $L_2$; and the second positive lens, $L_3$. The achromatic objective lens is defined by the following conditions.

(1) $40 < \nu_2 < 45$
(2) $P_2^* < 0.5700$, $P_2^{**} > 0.3300$
(3) $\nu_1 > \nu_2 + 15$
(4) $|\nu_3 - \nu_2| < 5$
(5) $P_3^* - P_2^* > 0.005$, $P_2^{} - P_3^{} > 0$
(6) $0.15\ f < -f_2 < 0.5\ f$
(7) $0.5 < f_1/f_3 < 2.0$ where:

$\nu_i$ is the Abbe's number of the lens $L_i$;

$P_i^*$ is the partial dispersion ratio of short wavelength part of the lens $L_i$; and $P^*$ is represented as follows:

$$P^* = \frac{n_g - n_F}{n_F - n_C}$$

where, $n_g$, $n_C$ and $n_F$ are the refractive indexes corresponding to g-line (436 nm), C-line (656 nm) and F-line (486 nm) of the optical glass material, respectively, $P_i^{}$ is the partial dispersion ratio of long wavelength part of the $L_i$; and $P^{}$ is represented as follows:

$$P^{**} = \frac{n_C - n_{A'}}{n_F - n_C}$$

where, $n_{A'}$, $n_C$ and $n_F$ are the refractive indexes corresponding to A'-line (768 nm), C-line and F-line of the optical glass material, respectively, f is the overall focal length; and $f_i$ is the focal length of the lens $L_i$. The conditions will now be illustrated in the preferred embodiment of this invention.

The careful selection of three kinds of glass materials for $L_1$, $L_2$, $L_3$ and the lens power arrangement are very important for the simultaneous compensation for the above-mentioned various aberrations without using particular optical materials. Hence, in the present invention, although ordinary materials can be employed, they must be selected carefully.

If the above conditions (1) to (5) are to be satisfied, it is important to select three kinds of glass materials. Conditions (6) and (7) relate to the power arrangement of each lens made of the selected glass material. In order to compensate for chromatic aberration, especially for secondary spectrum, it is required to consider partial dispersion ratios such as on short and long wavelengths in the selection of glass materials.

Condition (1) relates to the compensation of the primary chromatic aberration, defining the Abbe's number of the negative lens $L_2$ without loading excessive power on the lens. Below the lower limit, it is difficult to obtain a glass material having suitable dispersion and partial dispersion ratios for a positive lens. Above the upper limit, a costly particular optical material having a low dispersion must be employed and/or the power of each lens must be enhanced excessively, which is unsuitable to satisfy the objects of the invention.

Regarding condition (2), this also relates to the reduction of the secondary spectrum in each wavelength range, defining the partial dispersion ratios on the short and long wavelength sides.

Condition (3) relates to the requirement that large Abbe's number glass materials having a low dispersion be applied to the first positive lens $L_1$. Accordingly, since the lens power of $L_1$ is weakened, it is possible to appropriately compensate for the various aberrations.

Condition (4) defines the mutual relation of the Abbe's numbers between the second positive lens $L_3$ and the negative lens $L_2$. If $\nu_3$ and $\nu_2$ satisfy the condition, the chromatic aberration can be compensated without making the powers of the second and third lenses excessively large or small. If $\nu_3$ deviates from Condition (4), it is undesirable to compensate for the other aberrations by the lens power arrangement of the three lenses and the effect of the secondary spectrum reduction degenerates.

Furthermore, Condition (5) defines the difference of the partial dispersion ratios between the negative lens $L_2$ and the positive lens $L_3$ and is additionally, more effective to reduce the secondary spectrum, cooperating with Condition (2). By satisfying Conditions (2) and (5) simultaneously, the invention succeeds in remarkable reduction of the secondary spectrum in comparison with a conventional achromatic lens.

Using glass materials selected according to Conditions (1) to (5), from the theory of thin thickness intimate contact, the lens power arrangement of an achromatic lens system over the wide range of the wavelength can be obtained. However, the lens power of each lens which is obtained on the basis of the theory is, generally, very large, resulting in difficulty of machining and manufacturing with a great amount of residual spherical aberration. Such a lens is therefore not practical.

This invention solves the problem by the practical lens power arrangement as shown in Conditions (6) and (7). Namely, the secondary spectrum is allowed to enter into the range which is sufficiently narrow in practical use and the power of each lens is remarkably small in the realizable range. Hence, chromatic aberration and spherical aberration are simultaneously well compensated.

More specifically, by determining the power of the negative lens $L_2$ as shown in Condition (6), the resultant power of all the positive lenses is not excessive while the secondary spectrum can be maintained small. By exceeding the upper limit of Condition (6) to reduce the power of the negative lens $L_2$, the compensation of spherical aberration and sine condition will result, but there will be no effective reduction of the secondary spectrum. Below the lower limit, in turn, though the secondary spectrum can be smaller than required, the power of the positive lens becomes large therewith. Also, due to the generation of high order aberration spherical aberration and chromatic aberration of the spherical aberration, the sharpness of the image is deteriorated. Moreover, it becomes difficult to manufacture such a lens system.

Condition (7) defines that the resultant positive power of all the positive lenses is applied to the first lens and the third lens, separately, to thereby adequately compensate for the aberrations. If the upper and lower limits of Condition (7) are exceeded, excessive power is loaded on the lens $L_3$ and the lens $L_1$, respectively. As a result, the balance of chromatic aberration is greatly deteriorated and by excessive power, spherical aberration and the sine condition are deteriorated leading to difficulty of compensation.

When all conditions are satisfied an achromatic objective lens system results using readily available materials without the need for special processing. This invention can be illustrated by the following example.

DEFINITIVE EXAMPLE

| Lens | Surface | | $f = 100.0$ | F No. 1: 12 Distance along optical axis |
|---|---|---|---|---|
| $L_1$ | $R_1 =$ | 55.2096 | | $d_1 = 1.000$ |
| | $R_2 =$ | $-28.8000$ | | |
| | | | | $d_2 = 0.049$ |
| $L_2$ | $R_3 =$ | $-28.5730$ | | $d_3 = 0.417$ |
| | $R_4 =$ | 23.5163 | | $d_4 = 0.097$ |
| $L_3$ | $R_5 =$ | 22.6201 | | $d_5 = 1.000$ |
| | $R_6 =$ | $-79.7936$ | | |

| | $n_d$ | $\nu$ | P* | P** |
|---|---|---|---|---|
| $L_1$ | 1.51633 | 64.15 | 0.5350 | 0.3582 |
| $L_2$ | 1.61340 | 43.84 | 0.5623 | 0.3373 |
| $L_3$ | 1.53256 | 45.91 | 0.5747 | 0.3312 |

$P_3^* - P_2^* = 0.0124$
$P_2^{} - P_3^{} = 0.0061$
$-f_2 = 20.966$
$f_1/f_3 = 1.108$
$n_d$ is the refractive index on the d-line.

It is apparent that variations are present without departing from the essential characteristics of this invention.

What is claimed is:

1. An achromatic objective lens comprising: positive, negative and positive lenses, a first positive lens $L_1$, a negative lens $L_2$ and a second positive lens $L_3$, satisfying the following conditions:
    (1) $40 < \nu_2 < 45$
    (2) $P_2^* < 0.5700$, $P_2^{**} > 0.3300$
    (3) $\nu_1 > \nu_2 + 15$
    (4) $|\nu_3 - \nu_2| < 5$
    (5) $P_3^* - P_2^* > 0.005$, $P_2^{} - P_3^{} > 0$
    (6) $0.15 f < -f_2 < 0.5 f$
    (7) $0.5 < f_1/f_3 < 2.0$ where:
 $\nu_i$ is the Abbe's number of the lens $L_i$,
 $P_i^*$ is the partial dispersion ratio of short wavelength part of the lens $L_i$, where:

$$P^* = \frac{n_g - n_F}{n_F - n_C}$$

and $n_g$, $n_C$ and $n_F$ are the refractive indexes corresponding to g-line (436 nm), C-line (656 nm) and F-line (486 nm) of the optical glass material, respectively,
 $P_i^{**}$ is the partial dispersion ratio of long wavelength part of the $L_i$, where:

$$P^{**} = \frac{n_C - n_{A'}}{n_F - n_C}$$

and $n_{A'}$, $n_C$ and $n_F$ are the refractive indexes corresponding to A'line (768 nm), C-line and F-line of the optical glass material, respectively,
 f is the overall focal length, and
 $f_i$ is the focal length of the lens $L_i$, and the lens system further defined as follows:

| Lens | Surface | | $f = 100.0$ | F No. 1 : 12 Distance along optical axis |
|---|---|---|---|---|
| $L_1$ | $R_1 =$ | 55.2096 | | $d_1 = 1.000$ |
| | $R_2 =$ | $-28.8000$ | | |
| | | | | $d_2 = 0.049$ |

-continued

| | | |
|---|---|---|
| L$_2$ | R$_3$ = −28.5730 | d$_3$ = 0.417 |
| | R$_4$ = 23.5163 | |
| | | d$_4$ = 0.097 |
| L$_3$ | R$_5$ = 22.6201 | d$_5$ = 1.000 |
| | R$_6$ = −79.7936 | |

-continued

| | n$_d$ | ν | P* | P** |
|---|---|---|---|---|
| L$_1$ | 1.51633 | 64.15 | 0.5350 | 0.3582 |
| L$_2$ | 1.61340 | 43.84 | 0.5623 | 0.3373 |
| L$_3$ | 1.53256 | 45.91 | 0.5747 | 0.3312 |

P$_3$* − P$_2$* = 0.0124
P$_2$ − P$_3$ = 0.0061
−f$_2$ = 20.966
f$_1$/f$_3$ = 1.108, and
n$_d$ is the refractive index on the d-line.

* * * * *